(12) United States Patent
Ramanan et al.

(10) Patent No.: US 7,756,010 B2
(45) Date of Patent: Jul. 13, 2010

(54) METHOD AND SYSTEM FOR PREVENTING DATA PACKET LOSS IN A REDUNDANT PDSN ENVIRONMENT

(75) Inventors: Karthikeyan Ramanan, Bangalore (IN); Bhaskar Bhupalam, Sunnyvale, CA (US); Venkatesh Gota, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1050 days.

(21) Appl. No.: 11/316,503

(22) Filed: Dec. 21, 2005

(65) Prior Publication Data

US 2007/0140111 A1   Jun. 21, 2007

(51) Int. Cl.
*H04J 1/16* (2006.01)
*H04W 4/00* (2009.01)

(52) U.S. Cl. ...................................... 370/216; 455/423
(58) Field of Classification Search ........................ None
See application file for complete search history.

(56) References Cited

U.S. PATENT DOCUMENTS

| | | | |
|---|---|---|---|
| 6,853,617 B2 * | 2/2005 | Watson et al. | 370/218 |
| 7,076,555 B1 * | 7/2006 | Orman et al. | 709/227 |
| 7,116,634 B1 * | 10/2006 | Hanselmann | 370/219 |
| 7,363,534 B1 * | 4/2008 | Krishnamurthy et al. | 714/13 |
| 7,426,195 B2 * | 9/2008 | Mukherjee et al. | 370/328 |
| 2003/0235168 A1 * | 12/2003 | Sharma et al. | 370/338 |
| 2004/0073683 A1 * | 4/2004 | Beck et al. | 709/227 |
| 2004/0095881 A1 * | 5/2004 | Borella et al. | 370/219 |
| 2004/0100899 A1 * | 5/2004 | Mahamuni | 370/216 |
| 2005/0163059 A1 * | 7/2005 | Dacosta et al. | 370/252 |
| 2005/0201343 A1 * | 9/2005 | Sivalingham et al. | 370/338 |

OTHER PUBLICATIONS

Mun Choon Chan and Ramachandran Ramjee, "TCP/IP Performance over 3G Wireless Links with Rate and Delay Variation", 12 pages, copyright 2002, International Conference on Mobile Computing and Networking, Bell Labs, Lucent Technologies, ACM Press, New York, USA.

* cited by examiner

*Primary Examiner*—Hanh Nguyen
*Assistant Examiner*—Juvena Loo
(74) *Attorney, Agent, or Firm*—Trellis IP Law Group, PC

(57) ABSTRACT

A method and apparatus are provided for preventing data-packet loss upon a switchover from an active to a standby PDSN, in a redundant PDSN environment. Data-packet loss is prevented by modifying the checking of the sequence number associated with the data-packets. The first sequence number received upon switchover is used to determine the order of the subsequent GRE frames. The standby PDSN sends keep-alive packets associated with an arbitrary sequence number to a packet control function (PCF). On receiving a response from the PCF, the arbitrary sequence number is used as a starting sequence number for sending the data-packets. Otherwise, keep-alive packets with modified numbers are sent to the PCF. In synchronized communication sessions between the PDSN and the PCF, data-packet loss can be prevented by disabling the checking of the sequence number upon a switchover. In another embodiment, data-packet loss is prevented by excluding the sequence number.

17 Claims, 6 Drawing Sheets

METHOD AND SYSTEM FOR PREVENTING DATA PACKET LOSS IN A REDUNDANT PDSN ENVIRONMENT

BACKGROUND OF THE INVENTION

1. Field of Invention

Embodiments of the present invention relate, in general, to a redundant Packet Data Serving Node (PDSN) environment. More specifically, the Embodiments of the present invention relate to methods and systems for preventing data-packet loss upon a switchover to a standby device in the redundant PDSN environment.

2. Description of the Background Art

Code Division Multiple Access 2000 packet data services solution enables mobile operators to deliver packet data services in a code division multiple access (CDMA) environment. The CDMA is a technology of multiple access that does not divide the channel by time or frequency. Instead, CDMA comprises encoding data with a code associated with a channel and uses the constructive interference properties of the signal medium to perform the multiplexing. CDMA2000 is a multiple-access scheme for digital radio that can transmit voice, data and signaling data between mobile telephones and cell sites.

In a mobile wireless network such as CDMA2000, user sessions are terminated at a Packet Data Serving Node (PDSN). User sessions are active sessions wherein data-packet transfer takes place via the PDSN. The PDSN acts as the connector between the radio access and Internet Protocol (IP) networks. The PDSN is responsible for managing Point-to-Point Protocol (PPP) sessions between a mobile provider's core IP network and a mobile station. The PDSN can perform such activities via a Packet Control Function (PCF). A PCF is an entity in a radio access network that controls the transmission of packets between base station controller (BSC) and PDSN, here BSC is a part of the wireless system's infrastructure, that controls one or multiple cell sites' radio signals, thereby reducing the load. The BSC performs radio signal management functions for base receiver stations, such as frequency assignment and handoff.

PDSN and PCF use a Generic Routing Encapsulation (GRE) tunnel between them for commencing user sessions. The GRE tunnel is a protocol for encapsulation of an arbitrary network layer protocol over another arbitrary network layer protocol. In general, a packet that needs to be encapsulated and delivered to a destination is called a payload. The payload is first encapsulated in a GRE frame. The resulting GRE frame is encapsulated in another protocol and then forwarded to its destination. The other protocol is usually called the delivery protocol. The GRE tunnel uses a GRE key to distinguish different user sessions over the same GRE tunnel. The GRE key field contains a four-octet number, which is inserted by an encapsulator present in the GRE tunnel. The key field is used to identify an individual traffic flow of a session within a tunnel. Each GRE frame contains a data-packet and a GRE header. The GRE header can contain a sequence-number bit. If the sequence-number bit flag is present, then it indicates that the sequence number is included in the GRE header. The sequence number increases by one, each time a packet is sent from the PCF or the PDSN. The sequence number is provided in the GRE frame to ensure the receipt of the data-packets in the correct order. The PDSN maintains a current list of the last sequence number that it has sent or the last sequence number being received by the PCF.

A redundant PDSN environment is provided to enable uninterrupted services and better communication capabilities to the mobile stations. In a redundant PDSN environment, the user communication sessions that are terminated on a PDSN are not affected if the active PDSN malfunctions, because a standby PDSN immediately becomes active, taking over the functions of the malfunctioning PDSN. However, when the active PDSN currently hosting the session goes down, the standby PDSN does not know the last sequence number sent from the active PDSN or the last sequence number received from the PCF. This causes the received data-packet to be dropped in the time-space when the standby PDSN becomes active.

In a conventional method, the data-packet is dropped if the corresponding received sequence number lies in a last window size from an expected sequence number. For example, if the expected sequence number is x, then any received packet with sequence number between x−w to x−1 is dropped, where w is the window size. If the received sequence number lies outside the window, the data-packet is accepted and the sequence numbering continues from that sequence number. For a 32-bit GRE sequence number, typical window size could range from being as small as 8 to being as large as $2^{31}$. Therefore, when a switchover takes place, a data-packet is prevented from being dropped. However, this method exhibits certain limitations when the peer's window size is unknown.

DETAILED DESCRIPTION OF EMBODIMENTS OF THE PRESENT INVENTION

Embodiments of the present invention provide methods, systems and a computer readable media for preventing data-packet loss upon a switchover from an active Packet Data Serving Node (PDSN) to a standby PDSN. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the present invention provide methods, systems and a computer program product for preventing data-packet loss upon a switchover from an active Packet Data Serving Node (PDSN) to a standby PDSN. According to Embodiments of the present invention, upon a switchover from active to standby PDSN, the sequence number received by the standby PDSN is considered as the starting sequence number for checking the order of the subsequent sequence numbers. The sequence number is received in a Generic Routing Encapsulation (GRE) frame. The GRE frame contains a data-packet.

The standby PDSN sends keep-alive packets with an arbitrary number assigned to each keep-alive packet. The keep-alive packets are sent to a Packet Control Function (PCF). If the PCF responds to a keep-alive packet, then the PDSN sends a sequence number to the PCF. The sequence numbers are sent in a GRE frame. Each GRE frame contains a sequence number. The sequence number sent in the first GRE frame that is sent to the standby PDSN after the switch over is the same as the sequence number of the keep-alive packet for which the response is received. Thereafter, the sequence number of the first GRE frame is considered as the starting sequence number for checking the order of the GRE frames.

In accordance with an embodiment of the invention, the redundant PDSN environment is used for a synchronized communication session between the PDSN and the PCF. In this case, the checking of the sequence numbers assigned to the GRE frames, which are received by the standby PDSN, can be disabled. Moreover, the sequence numbers in the packets sent from PDSN to PCF can be excluded.

Figure 1:
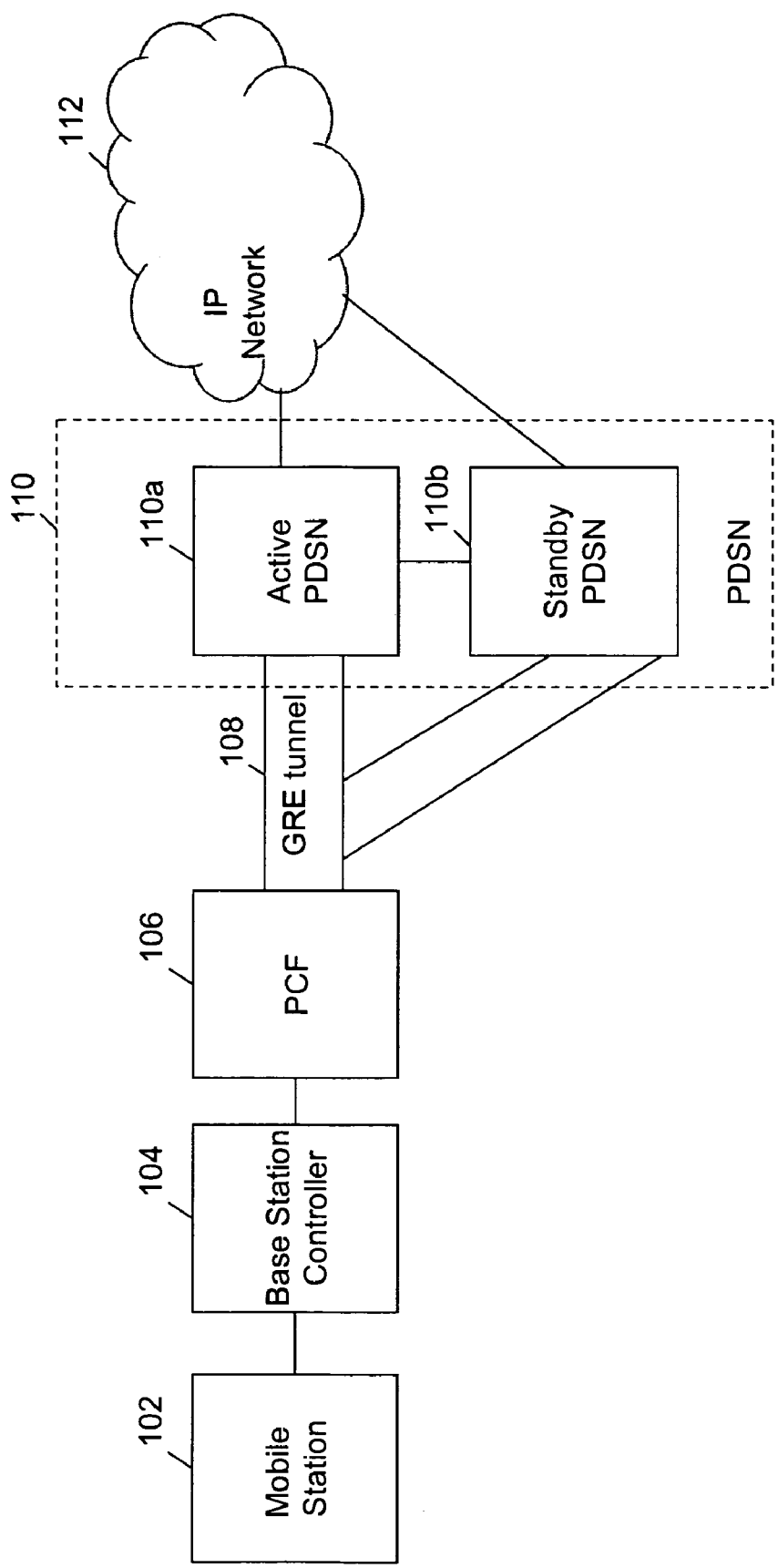
FIG. 1 illustrates a network environment for implementing a method for preventing data-packet loss upon a switchover from an active PDSN to a standby PDSN in a redundant PDSN environment, in accordance with Embodiments of the present invention.

Referring now to the drawings, particularly by their reference numbers, FIG. 1 illustrates a network environment 100 for preventing data-packet loss upon a switchover from an active PDSN to a standby PDSN in a redundant PDSN environment, in accordance with an embodiments of the present invention. Network environment 100 includes a Mobile Station (MS) 102, a Base Station Controller (BSC) 104, a Packet Control Function (PCF) 106, a Generic Routing Encapsulation (GRE) tunnel 108, a Packet Data Serving Node (PDSN) 110 such as an active PDSN 110a, and a standby PDSN 110b, and an Internet Protocol (IP) network 112. At any given time, PDSN 110 can be an active PDSN 110a or a standby PDSN 110b. Mobile station 102 is a wireless terminal, enabling the user to access network services over a radio interface. Mobile station 102 comprises terminal equipment, which can include a mobile phone, a laptop, or any communicating device enabled to communicate. Mobile station 102 supports either a simple Internet Protocol (IP) or a mobile IP. A simple IP is a connectionless protocol with a continual connection between the endpoints that are communicating. Each packet that travels through the Internet is treated as an independent unit of data without any relation to any other unit of data. On the other hand, mobile IP allows mobile computers to send and receive packets addressed with their home network IP address, regardless of the IP address of their current point of attachment on the Internet. Mobile IP maintains the current connections even if the point of attachment changes with the current connection being still active.

Mobile station 102 is connected to a radio tower that is further connected to BSC 104. BSC 104 is the infrastructure of the wireless that controls one or multiple cell sites' radio signals, thereby reducing the load. BSC 104 performs radio signal management functions for base receiver stations, managing functions such as frequency assignment and handoff. BSC 104 communicates with PDSN 110 through PCF 106 over a GRE tunnel 108. PDSN 110 is a component of the CDMA 2000 mobile network where a CDMA2000 packet data services solution enables mobile operators to deliver packet data services in a Code Division Multiple Access (CDMA) environment. CDMA2000 is a multiple access scheme for digital radio communication to send voice, data, and control signals between mobile telephones and cell sites. PDSN 110 acts as the connection point between the radio access and IP network 112. PDSN 110 is responsible for managing Point-to-Point Protocol (PPP) sessions between mobile provider's core IP network 112 and mobile station 102. PDSN 110 can perform such activities via PCF 106. PCF 106 is an entity in a radio access network that controls the transmission of packets between BSC 104 and PDSN 110. The functions of PDSN 110 and PCF 106 are described in detail in the subsequent paragraphs of the description section.

The transmission of data-packets between PDSN 110 and PCF 106 is carried out through GRE tunnel 108. GRE tunnel 108 is a means of communicating encapsulated data in a secure manner over a public network. GRE is a protocol used for encapsulating an arbitrary network layer protocol over another arbitrary network layer protocol. In general, a packet that is to be encapsulated and delivered to a destination is called a payload. In an embodiment of the invention, the data-packet is contained in a GRE frame. The payload is first encapsulated in a GRE frame. The resulting GRE frame is encapsulated in some other protocol and then forwarded. The other protocol is usually called the delivery protocol and may be any protocol required by the engineering considerations. Since the delivery protocol may vary depending on the application, and in a preferred embodiment is the Internet Protocol for GRE frames.

The encapsulated data-packet contained in the GRE frame, on reaching PDSN 110 is recovered through decapsulation. The recovered data-packet is transferred by PDSN 110 to IP network 112, which is a network in which information is transmitted by using IP protocol.

In a situation where active PDSN 110a malfunctions, a switchover takes place and standby PDSN 110b is activated. Upon the switchover from active PDSN 110a, standby PDSN 110b performs all the functions of active PDSN 110a.

PCF 106 receives the GRE frames sent by PDSN 110. Each GRE frame contains a data-packet and a GRE header. The GRE header can contain a sequence-number bit. If the sequence-number bit is set, then it indicates that the sequence number field is present in the GRE header. The sequence-number bit is included to provide the GRE frames containing the data-packets in a correct order. In a preferred embodiment of the present invention, the sequence number values range from 0 to $(2^{32}-1)$. The first GRE frame containing the data-packet is sent with a sequence number of 0. Thereafter, the sequence number is a free-running counter, represented by modulo $2^{32}$. A GRE frame containing a data-packet and a sequence number, which is not in the correct order, is discarded. A GRE frame is in an incorrect sequence if the sequence number in the received GRE frame is less than, equal to, or with an increment of two or more than two from the sequence number of the last successfully decapsulated data-packet. If the received GRE frame containing the data-packet is in the correct order, then the data-packet is successfully decapsulated. According to a preferred embodiment of the invention, a GRE frame containing the data-packet is considered to be in the correct order if the sequence number is one greater than the last successfully decapsulated data-packet. In another embodiment of the invention, a GRE frame containing the data-packet is considered to be in the correct order if a sequence-number bit is not set in the GRE header of the GRE frame.

PCF 106 checks the sequence number, if present in the GRE header, to ensure that the data-packets received in the incoming GRE frames are in the correct order. Further, PCF 106 decapsulates the data-packets contained in the GRE frames if they are in the correct order. In addition, the GRE frames that are sent without sequence numbers are not checked for their sequence, and are assumed to be in the correct order. These GRE frames without sequence numbers are also decapsulated by PCF 106.

PDSN 110 sends keep-alive packets to PCF 106. Each keep-alive packet is assigned an arbitrary number. If PCF 106 responds to a keep-alive packet, then PDSN 110 sends a series of GRE frames containing data-packets assigned with sequence numbers. The sequence number sent in the first GRE frame is same as the number of the keep-alive packet for which the response is received from PCF 106. In an embodiment of the invention, when PCF 106 does not respond to the keep-alive packet, then PDSN 110 modifies the arbitrary number of the keep-alive packets. In a preferred embodiment of the invention, PDSN 110 increments the number of the keep-alive packets by $2^{31}$. In another embodiment of the invention, the range of the increment depends on a window size. The window size can range from being as small as 8 to being as large as $2^{31}$. After incrementing the number, PDSN 110 sends the keep-alive packets assigned with the modified number. If PCF 106 responds to the keep-alive packets, then PDSN 110 sends a series of GRE frames with sequence-numbers. The sequence number sent in the first GRE frame is the same as the modified number of the keep-alive packet for which the response is received.

In another embodiment of the invention, upon a switchover from active PDSN 110a to standby PDSN 110b in a synchronized session, standby PDSN 110b disables the checking of the sequence numbers present in the GRE headers. Since PDSN 110 does not check the sequence number, the data-packet contained in the GRE frame is considered to be in the correct order. Subsequently, the data-packet is decapsulated by standby PDSN 110b.

In another embodiment of the invention, upon a switchover from active PDSN 110a to standby PDSN 110b, standby PDSN 110a excludes the sequence number bit from the GRE header. Since the sequence number bit is not present, the data-packet contained in the GRE frame is considered to be in the correct order. Subsequently, the data-packet is decapsulated by PCF 106.

Figure 2:
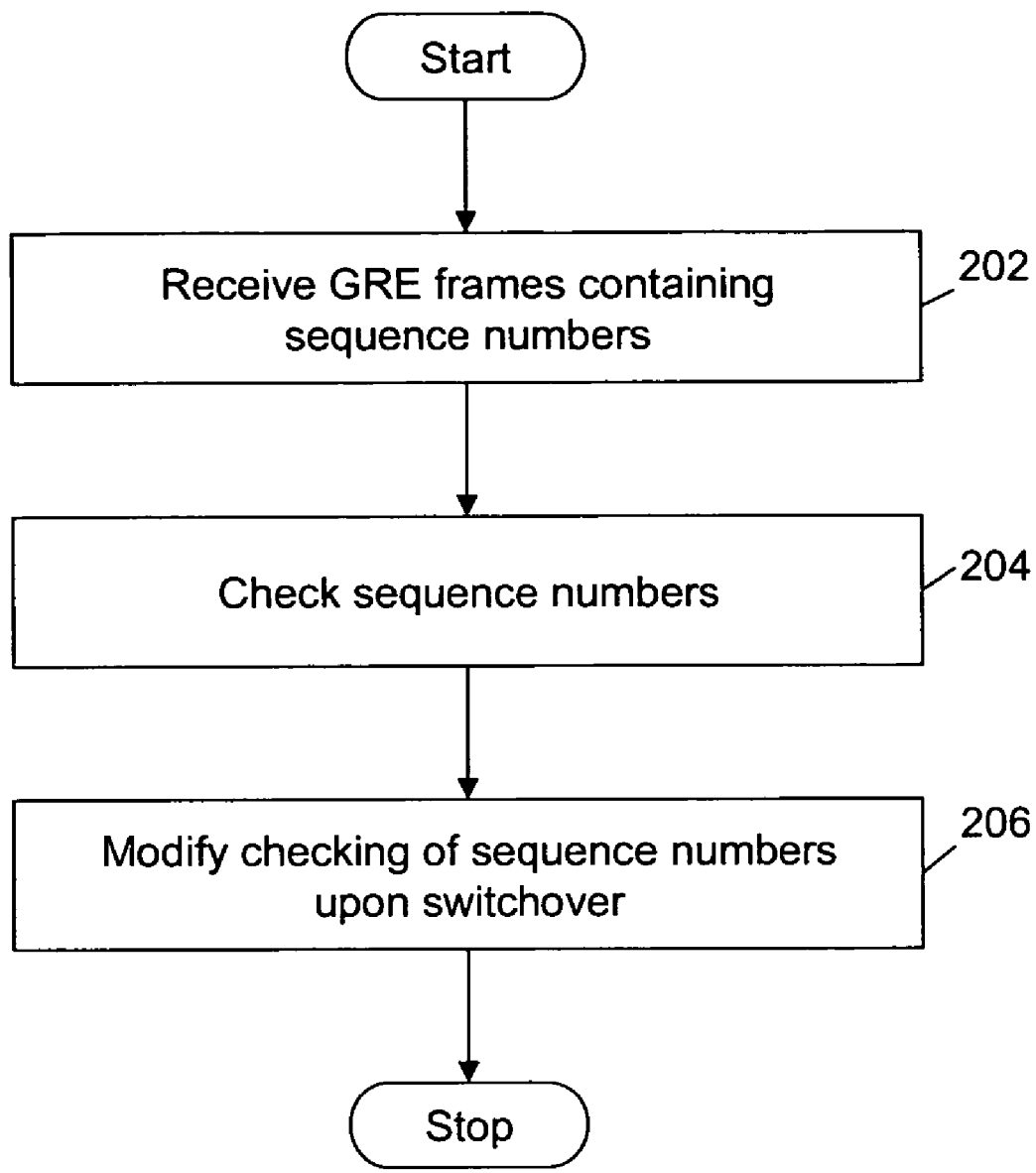
FIG. 2 is a flowchart, illustrating a method for preventing data-packet loss upon a switchover from an active PDSN to a standby PDSN in a redundant PDSN environment, in accordance with Embodiments of the present invention.

FIG. 2 is a flowchart, illustrating a method for preventing data-packet loss upon a switchover from an active PDSN to a standby PDSN in a redundant PDSN environment, in accordance with an embodiment of the present invention. At step 202, a series of data packet with sequence numbers is received. In an embodiment of the invention, a data-packet and a sequence number are contained in a GRE frame. At step 204, checking of the sequence numbers is performed to ensure that the data-packets are received in the correct order. In a situation where active PDSN 110a develops malfunctioning, then standby PDSN 110b replaces active PDSN 110a and performs the function of active PDSN 110a. Subsequently, at step 206, the checking of the sequence number is modified to prevent data-packet loss upon switchover. In an embodiment of the invention, standby PDSN accepts the sequence number associated with the data-packet received upon a switchover. The sequence number is accepted to prevent the loss of first data-packet. Subsequently, the accepted sequence number is considered as the starting sequence number to ensure data-packets are received in the correct order. In another embodiment of the invention, keep-alive packets, which are assigned with an arbitrary sequence number, are sent from standby PDSN 110b to active PDSN 110a. If a response is received from PCF 106 for the sent keep-alive packets then the arbitrary sequence number associated with the keep-alive packets are accepted by standby PDSN 110b and used as the starting sequence number for sending data-packets. In a situation when a response is not received, then standby PDSN 110b provides an increment of $2^{31}$ in the sequence number of the keep-alive packets. The modified sequence number is sent to PCF 106 and when a response is received, the modified sequence number is accepted by standby PDSN 110b. The modified sequence number is used as the starting sequence number for sending further data-packets. In yet another embodiment of the invention, upon a switchover in a synchronized session, standby PDSN 110b disables the checking performed on the sequence numbers. Since the checking is disabled, the data-packets received upon switchover are considered to be in the correct order and therefore, are accepted. In another embodiment of the invention, standby PDSN 110b excludes the sequence numbers associated with the data-packets. Subsequently, data-packets are considered to be in the correct order and therefore, data-packets are accepted when received at PCF 106. All the embodiments explained above have been described in detail later in the description section.

Figure 3:
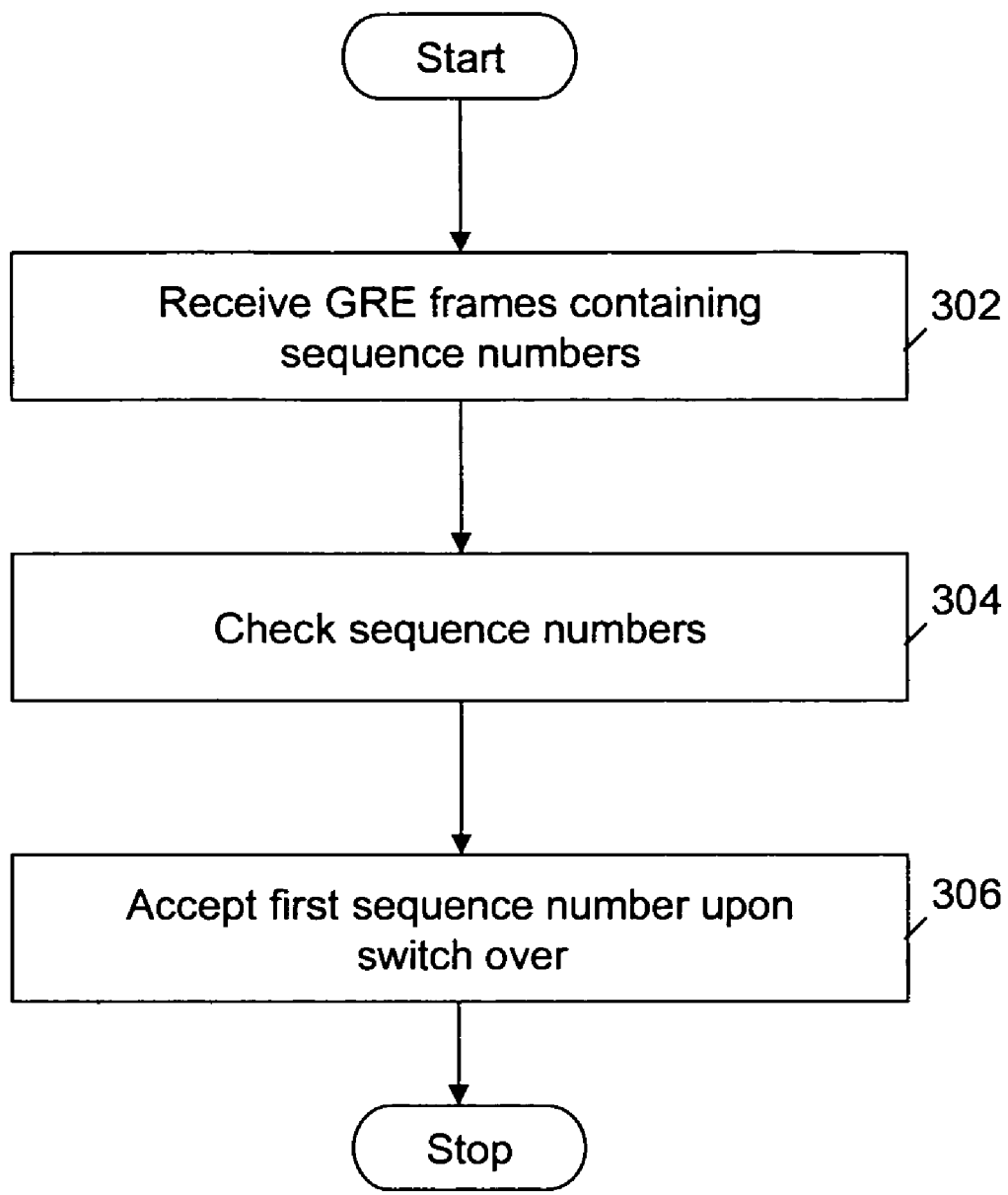
FIG. 3 is a flowchart, illustrating a method for preventing data-packet loss upon a switchover from an active PDSN to a standby PDSN in a redundant PDSN environment, in accordance with Embodiments of the present invention.

FIG. 3 is a flowchart, illustrating a method for preventing data-packet loss upon switchover from active PDSN 110a to standby PDSN 110b in a redundant PDSN environment, when a sequence number sent from PCF 106 is received by standby PDSN 110b, in accordance with an embodiment of the present invention. Upon switching from an active PDSN 110a to standby PDSN 110b, a sequence number is received from PCF 106, by standby PDSN 110b. The sequence number is associated with a data-packet. In an embodiment of the invention, both a sequence number and a data-packet are contained in a GRE frame. At step 302, PDSN 110 receives a series of GRE frames from PCF 106. A GRE frame contains a data-packet and a GRE header. The GRE header may also contain a sequence-number bit. At step 304, PDSN 110 checks the sequence number of the received GRE frames. The sequence numbers are checked by taking the sequence number of the last successfully decapsulated data-packet as the starting sequence number. The sequence number values can range from 0 to $(2^{32}-1)$. In situations where active PDSN 110a develops a malfunction, a switchover takes place from active PDSN 110a to standby PDSN 110b. A malfunction may be any condition or state that prevents PDSN 110a from functioning in an efficient manner or otherwise results in PDSN 110a being non-functional. As used herein, a malfunction may also include instances Where PDSN 110a is taken off-line by an administrator to upgrade its control software or for regularly scheduled maintenance. In an embodiment of the invention, when a switchover takes place, standby PDSN 110b is not necessarily aware of the sequence number of the last successfully decapsulated data-packet that was received by active PDSN 110a. Subsequently, at step 306, standby PDSN 110b accepts the sequence number received in the GRE frame and decapsulates the data-packet. Further, the received sequence number is used as the starting sequence number for receiving the data-packets in a correct order.

Figure 4:
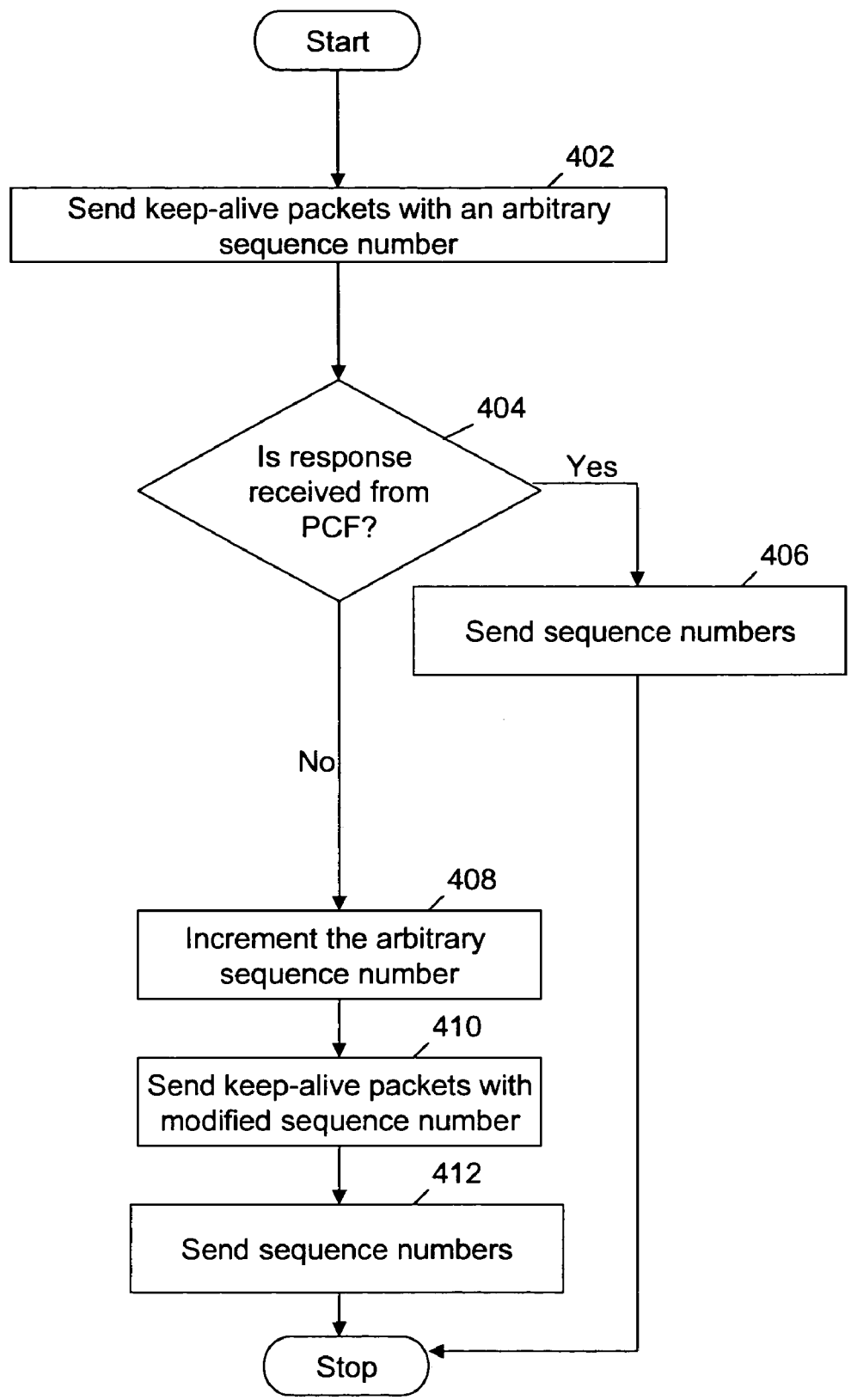
FIG. 4 is a flowchart, illustrating a method for preventing data-packet loss upon a switchover from an active PDSN to a standby PDSN in a redundant PDSN environment, when keep-alive packets are sent from the standby PDSN to the PCF, in accordance with Embodiments of the present invention.

FIG. 4 is a flowchart, illustrating a method for preventing data-packet loss upon a switchover from active PDSN 110a to standby PDSN 110b in a redundant PDSN environment, wherein keep-alive packets are sent from standby PDSN 110b to PCF 106, in accordance with an embodiment of the present invention. At step 402, standby PDSN 110*b* sends keep-alive packets to PCF 106. Each keep-alive packet is assigned an arbitrary sequence number. At step 404, receipt of a response from PCF 106 is checked. Subsequently, at step 406, standby PDSN 110*b* sends a series of sequence numbers, if a response is received from PCF 106 for the sent keep-alive packets. Each sequence number is associated with a data-packet. In an embodiment of the invention, a sequence number and a data-packet are sent in a GRE frame. The sequence number sent in the first GRE frame is the same as the number of the keep-alive packet for which the response is received. At step 408, standby PDSN 110*b* modifies the arbitrary sequence number of the keep-alive packets by incrementing its value, if a response is not received by PCF 106 for the arbitrary sequence number. The modification is performed by incrementing the number of the keep-alive packets by a window size. The data-packets in GRE frames are dropped if the received sequence number lies in the last window size from the expected sequence number. For example, if the expected sequence number is x, then any received data-packet with sequence number between x–w to x–1 (where w is the window size) is dropped. If the received sequence number lies outside the window, the data-packet is accepted and the sequence numbering is continued further from that sequence number onwards. For a 32-bit GRE sequence number, typical window size could be from as small as 8 to as large as $2^{31}$.

In accordance with an embodiment of the present invention, the window size of the PDSN 110 is preferably $2^{31}$. At step 410, PDSN 110 sends the keep-alive packets with the modified number. At step 412, standby PDSN 110*b* sends a series of sequence numbers, when a response is received from PCF 106. Preferably, the sequence numbers are sent in GRE frames with the sequence number sent in the first GRE frame being the same as the modified sequence number of the keep-alive packet for which the response is received.

Figure 5:
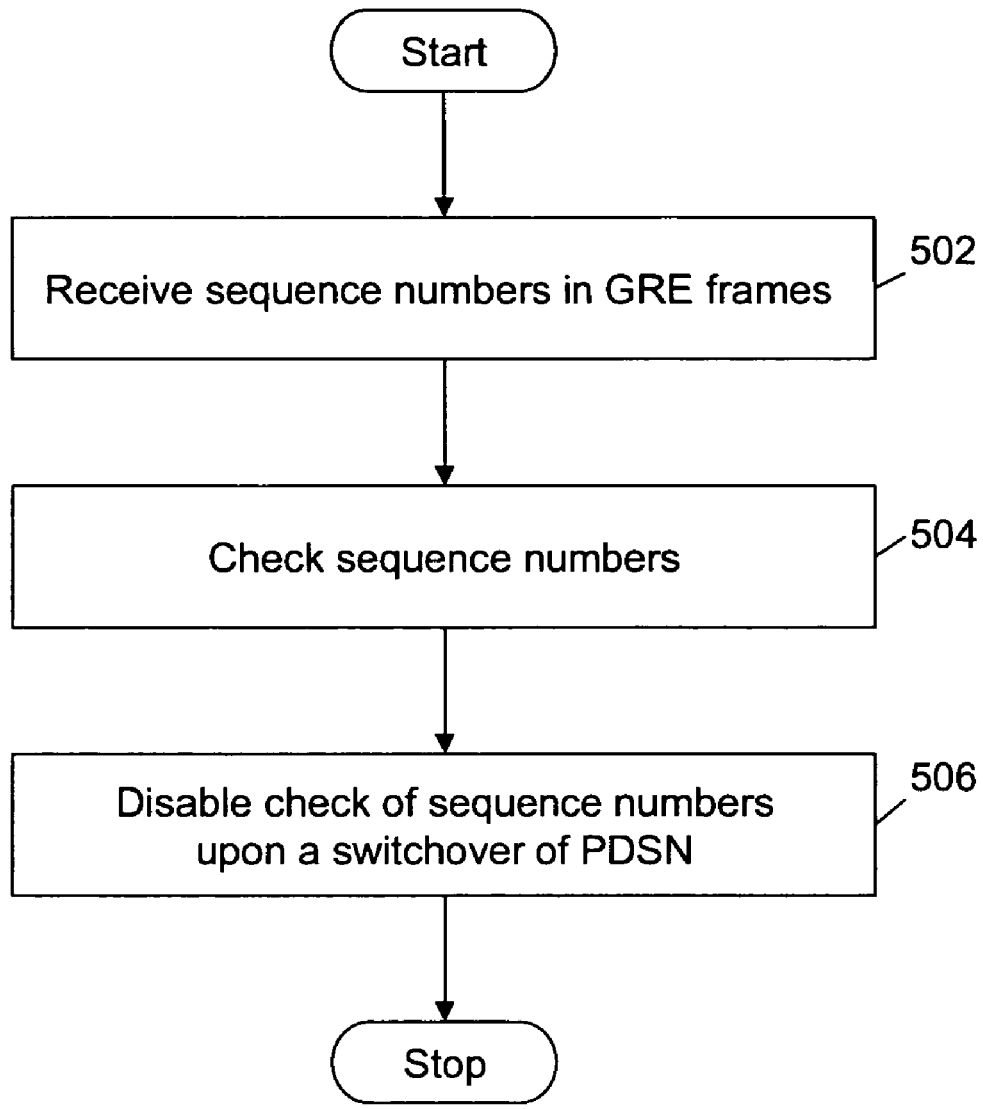
FIG. 5 is a flowchart, illustrating a method for disabling the checking of sequence number contained in the GRE frames, in accordance with Embodiments of the present invention.

FIG. 5 is a flowchart, illustrating a method for preventing data-packet loss by disabling the checking of the sequence numbers, in accordance with an embodiment of the present invention. At step 502, PDSN 110 receives the sequence number sent by PCF 106. Each sequence number is associated with a data-packet. In an embodiment of the invention, a sequence number and a data-packet are sent in a GRE frame. A GRE frame contains a data-packet and a GRE header. The GRE header includes a sequence-number bit. At step 504, PDSN 110 checks the sequence number in the GRE header. PDSN 110 checks the sequence number to ensure an orderly delivery of the data-packets. In an embodiment of the invention, upon a switchover for a synchronized communication session, standby PDSN 110*b* does not know the sequence number of the last successfully received data-packet. Therefore, at step 506, standby PDSN 110*b* that is now active, disables the checking of the sequence numbers present in the GRE frames. Since the check on the sequence numbers is disabled, the data-packet in the received GRE frame is considered to be in order. Subsequently, the data-packet is successfully decapsulated by standby PDSN 110*b*.

Figure 6:
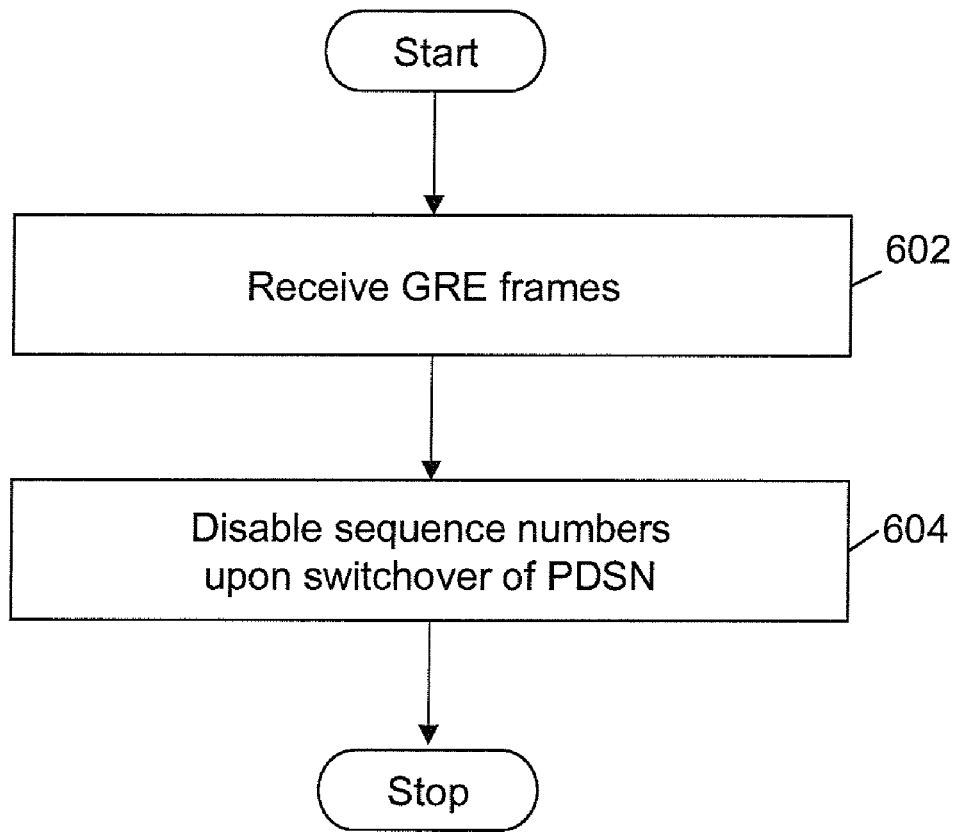
FIG. 6 is a flowchart, illustrating a method for the exclusion of the sequence number, in accordance with Embodiments of the present invention.

FIG. 6 is a flowchart, illustrating a method for preventing data-packet loss upon switchover by the exclusion of sequence numbers, in accordance with an embodiment of the present invention. At step 602, PCF 106 receives a GRE frame from active PDSN 110*a*. A GRE frame contains a data-packet and a GRE header. The GRE header may contain a sequence-number bit. If the sequence-number bit in the GRE header is set, then it indicates that the sequence-number field is present. Otherwise, the sequence-number field is not present. In an embodiment of the invention, for a synchronized communication session, upon switchover, standby PDSN 110*b* does not know the sequence number of the last GRE frame sent by active PDSN 110*a*. In such a case, at step 604, standby PDSN 110*b*, which is now active, excludes the sequence-number bit present in the GRE header. Since the sequence-number bit is not present in the GRE frame, the data-packet contained in the GRE frame is considered to be in order. Subsequently, the data-packet is decapsulated by PCF 106.

Embodiments of the present invention have the advantage of preventing the loss of data-packets upon the switchover from active PDSN 110*a* to standby PDSN 110*b* in a redundant PDSN 110 environment. Data-packet loss is prevented by modifying the checking of the sequence number upon a switchover. Moreover, embodiments of the present invention ensure better network availability and uninterrupted services for mobile station 102.

According to embodiments of the present invention, a method for notifying a user regarding an event occurring at a node in a network is provided. The method comprises receiving a series of sequence numbers each of which is associated with a data-packet; checking the sequence numbers; and modifying the checking of the sequence numbers upon switchover from the active PDSN to the standby PDSN, the modifying the checking is done to prevent data-packets loss.

In another embodiment of the invention, an apparatus for notifying a user regarding an event occurring at a node in a network is provided. The apparatus comprises a PDSN for receiving a series of sequence number, where each sequence number is associated with a data-packet, for sending the series of sequence numbers, for sending the keep-alive packets, for checking the sequence number, for accepting the sequence number as starting sequence number, and for modifying the checking of the sequence numbers; and a Packet Control Function (PCF) for receiving a series of sequence number, where each sequence number is associated with a data-packet, for sending the series of sequence numbers, for checking the sequence number, for providing the response for the keep-alive packets.

Embodiments of the present invention provide a machine-readable medium that includes instructions executable by a computer processor. One or more of these instructions control the receipt of a series of sequence numbers each of which is associated with a data-packet. Other instructions check the sequence numbers. Still other instructions modify the checking of the sequence numbers upon switchover from the active PDSN to the standby PDSN, the modifying the checking is done to prevent data-packets loss.

In other embodiments, an apparatus for notifying a user regarding an event occurring at a node in a network is provided. The apparatus comprises a processor for executing instructions and a machine-readable medium that includes instructions executable by the processor. The instructions enable the apparatus to receive a series of sequence numbers each of which is associated with a data-packet; to check the sequence numbers; and to modify the checking of the sequence numbers upon switchover from the active PDSN to the standby PDSN, the modifying the checking is done to prevent data-packets loss.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for preventing data-packet loss upon a switchover from an active Packet Data Serving Node (PDSN) to a standby PDSN in a redundant PDSN environment, the method comprising:
   receiving a series of sequence numbers each of which is associated with a data-packet;
   checking the sequence numbers; and
   modifying the checking of the sequence numbers upon switchover from the active PDSN to the standby PDSN, wherein modifying comprises:
   disabling the checking of the sequence numbers by the standby PDSN, where the sequence numbers are received in one or more data packets from a Packet Control Function (PCF) and are not checked; and
   disabling sequence numbers by the standby PDSN in one or more data packets sent to the PCF.

2. The method of claim 1, wherein the receiving the series of sequence numbers comprises receiving the series of sequence numbers in Generic Routing Encapsulation (GRE) frames wherein each GRE frame contains a data-packet.

3. The method of claim 1, wherein the modifying the checking of the sequence numbers upon switchover is performed for a synchronized session.

4. The method of claim 1, wherein the modifying the checking of the sequence number upon switch over comprises:

accepting a sequence number received upon switchover as the starting sequence number, the sequence number is accepted by the PDSN; and using the starting sequence number for assessing a correct order of receiving further sequence numbers.

5. The method of claim 4, wherein the receiving the series of sequence numbers comprises receiving an arbitrary sequence number in keep-alive packets where the keep-alive packets are received upon switch over by the PCF.

6. The method of claim 4, wherein the receiving the arbitrary sequence number comprises receiving a modified sequence number in keep-alive packets if a response is not received from the standby PDSN for the arbitrary sequence number, wherein the modified sequence number is 2^31 more then the arbitrary sequence number.

7. The method of claim 4, wherein the receiving the arbitrary sequence number comprises:

accepting the arbitrary sequence number received in a keep-alive packet if a response is received by the PCF for the keep-alive packet;

using the arbitrary sequence number as a starting sequence number; and sending a series of sequence numbers by the standby PDSN based on the starting sequence number.

8. The method of claim 4, wherein the receiving the modified sequence number comprises:

accepting the modified sequence number received in a keep-alive packet, the modified sequence number is accepted by the standby PDSN;

using the modified sequence number as a starting sequence number; and sending a series of sequence numbers by the standby PDSN based on the modified sequence number.

9. A system for preventing data-packet loss upon a switchover from an active Packet Data Serving Node (PDSN) to a standby PDSN in a redundant PDSN environment, the system comprising:

means, associated with the standby PDSN, for receiving a series of sequence numbers each of which is associated with a data-packet;

means for checking the sequence numbers; and means, associated with the checking means, for modifying the checking of the sequence numbers upon switchover from the active PDSN to the standby PDSN, wherein means for modifying comprises:

means for disabling the checking of the sequence numbers by the standby PDSN, where the sequence numbers are received in one or more data packets from a Packet Control Function (PCF) and are not checked; and means for disabling sequence numbers by the standby PDSN in one or more data packets sent to the PCF.

10. The system of claim 9, wherein each of the series of sequence numbers are associated with a Generic Routing Encapsulation (GRE) frame.

11. The system of claim 10, wherein the modifying means excludes the sequence number bit from the GRE header associated with each GRE frame.

12. An apparatus for preventing data-packet loss upon switchover from an active PDSN to a standby PDSN in a redundant Packet Data Serving Node (PDSN) environment, the apparatus comprising:

a processing system including a computer processor coupled to a display and user input device;

a machine-readable storage medium including instructions executable by the computer processor comprising one or more instructions for receiving a series of sequence numbers each of which is associated with a data-packet;

one or more instructions for checking the sequence numbers; and one or more instructions for modifying the checking of the sequence numbers upon switchover from the active PDSN to the standby PDSN, wherein one or more instructions for modifying comprises:

one or more instructions for disabling the checking of the sequence numbers by the standby PDSN, where the sequence numbers are received in one or more data packets from a Packet Control Function (PCF) and are not checked; and one or more instructions for disabling sequence numbers by the standby PDSN in one or more data packets sent to the PCF.

13. The apparatus of claim 12, wherein the one or more instructions for receiving the series of sequence numbers comprise one or more instructions for receiving the series of sequence numbers in Generic Routing Encapsulation (GRE) frames wherein each GRE frame contains a data-packet.

14. The apparatus of claim 12, wherein the one or more instructions for modifying the checking of the sequence numbers upon switchover is performed for a synchronized session.

15. The apparatus of claim 12, wherein the one or more instructions for modifying the checking of the sequence number upon switch over comprise:

one or more instructions for accepting a sequence number received upon switchover as the starting sequence number, the sequence number is accepted by the PDSN; and one or more instructions for using the starting sequence number for assessing a correct order of receiving further sequence numbers.

16. The apparatus of claim 15, wherein the one or more instructions for receiving the series of sequence numbers comprise one or more instructions for receiving an arbitrary sequence number in keep-alive packets where the keep-alive packets are received upon switch over by the PCF.

17. The apparatus of claim 15, wherein the one or more instructions for receiving the arbitrary sequence number comprise one or more instructions for receiving a modified sequence number in keep-alive packets if a response is not received from the standby PDSN for the arbitrary sequence number, wherein the modified sequence number is 2^31 more then the arbitrary sequence number.

* * * * *